April 8, 1947.  G. L. WALKER  2,418,533
GAS TORCH
Filed Jan. 26, 1944
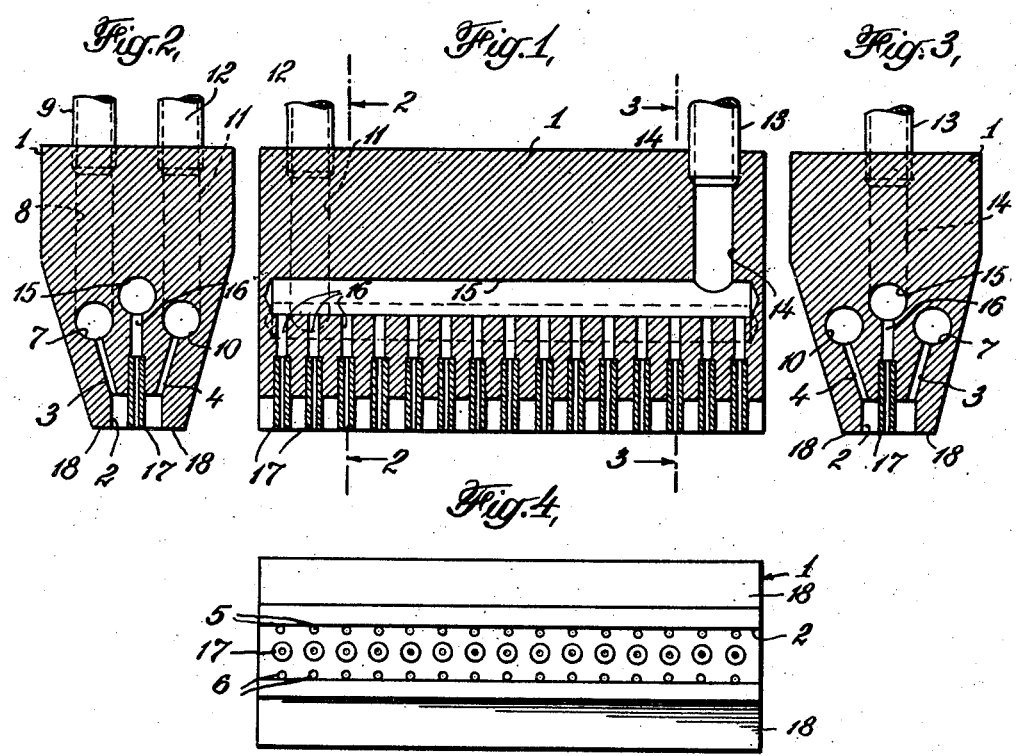
INVENTOR.
George L. Walker
BY
ATTORNEYS Patented Apr. 8, 1947

2,418,533

UNITED STATES PATENT OFFICE 2,418,533

GAS TORCH

George L. Walker, Jersey City, N. J., assignor to Air Reduction Company, Incorporated, a corporation of New York Application January 26, 1944, Serial No. 519,775

2 Claims. (Cl. 158—27.4)

1

This invention relates to torches such as oxy-acetylene torches, and more particularly to torches of the block-tip type intended for such uses as descaling or flame-cleaning metal surfaces.

In descaling or flame-cleaning, or performing similar operations by the use of gas torches, it is advantageous to utilize high velocity and highly oxidizing flame jets; but with torches heretofore used for this purpose, there is a tendency for the flames to blow away from the tip and blow out if high velocity jets are employed. Moreover, if the tip of such a torch becomes too hot, there is danger of flashbacks, so it is customary to make use of water-cooled tips.

The principal object of this invention is to provide a descaling or flame-cleaning torch having a tip of the block type so designed that it is capable of being operated very hot with no possibility of flashbacks and so that high velocity and highly oxidizing flame jets can be employed without danger of the flames blowing away from the tip or blowing out.

According to the invention, one or more series of fuel gas jets and a series of oxygen jets issue from the face of the block-tip and the face is provided with an elongated recess into which the fuel gas jets or both the fuel gas and oxygen jets are discharged. The oxygen does not mix with the fuel gas within the torch tip to produce a mixture which is discharged into the recess, but the gases mix externally of the tip. Since the torch thus works on the external mixing principle, the danger of flashbacks is eliminated and the torch tip can be operated as hot as desired without causing flashbacks. Users prefer a descaling or flame-cleaning torch whose tip can withstand such a high temperature because then it need not be water-cooled thus eliminating the necessity of hoses for cooling-water which are objectionable and inconvenient when descaling or flame-cleaning since the torch has to be moved over large areas. The longitudinal recess in the face of the tip into which the fuel gas passages or both the fuel gas and oxygen passages open eliminates the tendency of the flames to blow away from the face of the tip and blow out.

Two embodiments of the invention are illustrated in the accompanying drawing, in which:

Fig. 1 is a longitudinal section through one form of torch tip embodying the invention;

Fig. 2 is a vertical transverse section taken on the line 2—2 of Fig. 1;

Fig. 3 is a vertical transverse section taken on the line 3—3 of Fig. 1; and

2

Fig. 4 is a bottom view of the torch tip shown in Fig. 1 looking toward the face of the tip.

The torch illustrated in the drawing comprises an elongated block-tip 1 having a recess 2 in its lower face extending lengthwise of the block. The block has two rows of fuel gas passages 3 and 4 terminating in two rows of discharge orifices 5 and 6, respectively, in the bottom of the recess 2 as shown in Fig. 4. The passages 3 are all fed with fuel gas, such as acetylene, from a distributing chamber 7 located within the block and extending lengthwise of it. Fuel gas may be supplied to the distributing chamber 7 through a vertical passage 8 in the block communicating with a gas supply pipe 9. Similarly the passages 4 are all fed with fuel gas, such as acetylene, from a second distributing chamber 10 within the block and extending lengthwise thereof parallel to the distributing chamber 7. The fuel gas may be supplied to the distributing chamber 10 through a vertical passage 11 communicating with a second gas supply pipe 12.

Oxygen is supplied to the torch through a third pipe 13 and passes through a vertical passage 14 (Figs. 1 and 3) into a third distributing chamber 15 extending lengthwise of the block and disposed parallel to the distributing chambers 7 and 10. The oxygen is distributed by the chamber 15 to a longitudinal series of vertical passages 16 extending toward the recess 2. In the form of the invention illustrated in Figs. 1 to 4, the passages 16 do not discharge the oxygen directly into the recess 2 but each of the passages 16 discharges through a nozzle 17 fitted into the block and projecting at least partly through the recess. The nozzles preferably project completely through the recess and terminate substantially flush with the extreme lower portions 18 of the tip-face as shown in Figs. 1 to 3.

It will now be seen that the fuel gas and the oxygen do not mix within the torch tip but the oxygen issuing in a series of jets from the nozzles 17 mixes with the fuel gas issuing from the two series of orifices 5 and 6 in the bottom of the recess, and the mixing of the oxygen and fuel gas therefore takes place outside of the torch tip to form a combustible mixture which feeds the flames. The longitudinal recess 2, into the bottom of which the fuel gas discharges around the nozzles 17, has been found to be highly effectiv in eliminating the tendency of the flames to blow away from the face of the tip and blow out. Therefore the torch may be so designed and operated that the oxygen jets or fuel gas jets or both are relatively high velocity jets. It is well understood in the art that higher flame temperatures are obtained by increasing the oxygen-acetylene ratio up to 2½ to 1 or even higher, and higher flame temperatures are an important factor in descaling. However, gas mixtures having high oxygen-acetylene ratios are so explosive that they flashback readily in an ordinary torch tip after the torch becomes hot. With a torch tip of the kind above described, the ratio of oxygen to acetylene can be as high as desired.

If desired, fuel gas may be supplied to the distributing chamber 15 instead of oxygen, and the oxygen may be supplied to the distributing chambers 7 and 10.

I claim:

1. A gas torch comprising an elongated block having a recess in its lower face extending lengthwise of the block, a series of nozzles carried by the block projecting into and through said recess and terminating substantially flush with the lower-most portion of the tip-face, said nozzles forming a series of gas passages, a series of gas passages in the block opening into the bottom of the recess, and means for delivering oxygen to all of the gas passages of one series and fuel gas to all of the gas passages of the other series.

2. A gas torch comprising an elongated solid block having a recess in its lower face extending lengthwise of the block, a series of gas passages formed in the solid block each of which extends toward the bottom face of said recess substantially at right angles thereto, a series of nozzles carried by the block and projecting from the bottom face of said recess and terminating within the recess, each of said nozzles communicating with one of said gas passages, a second series of gas passages formed in the solid block and terminating in discharge orifices in the bottom face of the recess, and means for delivering oxygen to all of the gas passages of one series and fuel gas to all of the gas passages of the other series whereby one of the gases is conducted by the nozzles from the bottom of the recess to the discharge ends of the nozzles and the other gas is discharged directly from said orifices in the bottom face of the recess.

GEORGE L. WALKER.

REFERENCES CITED

The following references are of record in the file of this patent:

UNITED STATES PATENTS

| Number | Name | Date |
| --- | --- | --- |
| 784,101 | Brinkman | Mar. 7, 1905 |
| 216,562 | Eames | June 17, 1879 |
| 1,950,015 | Winder et al. | Mar. 6, 1934 |
| 1,535,491 | Partlow | Apr. 28, 1925 |
| 1,957,855 | States | May 8, 1934 |
| 518,624 | Olsen | Apr. 24, 1894 |
| 1,932,321 | Moseley | Oct. 24, 1933 |
| 2,356,196 | Barnes et al. | Aug. 22, 1944 |

FOREIGN PATENTS

| Number | Country | Date |
| --- | --- | --- |
| 402,400 | German | Sept. 15, 1924 |